(12) United States Patent
Peng et al.

(10) Patent No.: US 10,647,586 B2
(45) Date of Patent: May 12, 2020

(54) AMPHIPHILIC MOLECULAR SIEVE CONTAINING LIPOPHILIC GROUP ON THE OUTSIDE AND HYDROPHILIC GROUP ON THE INSIDE AND PRODUCTION METHOD THEREOF

(71) Applicant: PetroChina Company Limited, Beijing (CN)

(72) Inventors: Baoliang Peng, Beijing (CN); Zongtao Zhang, Beijing (CN); Pingmei Wang, Beijing (CN); Runwei Wang, Beijing (CN); Bin Ding, Beijing (CN); Jianhui Luo, Beijing (CN); Lipeng He, Beijing (CN); Ying Wang, Beijing (CN); Xiangfei Geng, Beijing (CN)

(73) Assignee: PetroChina Company Limited, Beijing (CN)

( * ) Notice: Subject to any disclaimer, the term of this patent is extended or adjusted under 35 U.S.C. 154(b) by 137 days.

(21) Appl. No.: 16/029,170

(22) Filed: Jul. 6, 2018

(65) Prior Publication Data

US 2019/0202704 A1    Jul. 4, 2019

(30) Foreign Application Priority Data

Jan. 3, 2018 (CN) .......................... 2018 1 0003495

(51) Int. Cl.
```
C01B 39/02     (2006.01)
C01B 39/38     (2006.01)
B01J 29/40     (2006.01)
```
(52) U.S. Cl.
CPC ............. *C01B 39/026* (2013.01); *B01J 29/40* (2013.01); *C01B 39/38* (2013.01); *B01J 2229/12* (2013.01);
(Continued)

(58) Field of Classification Search
CPC ... C01B 39/026; C01B 39/38; C01P 2004/34; C01P 2004/36; C01P 2006/90;
(Continued)

(56) References Cited

U.S. PATENT DOCUMENTS

| 4,138,363 A | 2/1979 | Hertzenberg et al. |
| 2014/0051883 A1 | 2/2014 | Kim et al. |

(Continued)

FOREIGN PATENT DOCUMENTS

| CN | 1663912 A | 9/2005 |
| CN | 102689911 A | 9/2012 |

(Continued)

OTHER PUBLICATIONS

Tsuji, K., et al., "Organic-functionalized molecular sieves (OFMSs) I. Synthesis and characterization of OFMSs with polar functional groups", Microporous and Mesoporous Materials, 29 (1999) 339-349.

(Continued)

*Primary Examiner* — David M Brunsman
(74) *Attorney, Agent, or Firm* — Hamilton, Brook, Smith & Reynolds, P.C.

(57) ABSTRACT

The present invention provides an amphiphilic molecular sieve containing a lipophilic group on the outside and a hydrophilic group on the inside and a production method thereof. The production method comprises: dispersing the nano-ZSM-5 molecular sieve into toluene, adding an organosilane containing a lipophilic group and reacting at 60-100° C. for 4-16 h, to obtain a molecular sieve containing a lipophilic group; placing the molecular sieve containing a lipophilic group in a mixed solution of sodium hydroxide solution and ethanol and reacting at 60-95° C. for 20-60 min, to obtain a molecular sieve containing a lipophilic group on the outside; dispersing the molecular sieve containing a lipophilic group on the outside into toluene, adding an organosilane containing a hydrophilic group and reacting at 60-100° C. for 4-16 h, to obtain the amphiphilic molecular sieve containing a lipophilic group on the outside and a hydrophilic group on the inside. The present invention also (Continued)

provides a molecular sieve obtained by the above production method, which does not destroy the characteristics of the original molecular sieve and has hydrophilic and lipophilic amphiphilic properties.

17 Claims, 3 Drawing Sheets

(52) U.S. Cl.
CPC ........ *B01J 2229/18* (2013.01); *B01J 2229/32* (2013.01); *B01J 2229/38* (2013.01); *B01J 2229/40* (2013.01); *C01P 2002/72* (2013.01); *C01P 2004/03* (2013.01); *C01P 2004/04* (2013.01); *C01P 2004/34* (2013.01); *C01P 2004/36* (2013.01); *C01P 2004/90* (2013.01); *C01P 2006/16* (2013.01); *C01P 2006/90* (2013.01)

(58) Field of Classification Search
CPC .... B01J 29/40; B01J 2229/12; B01J 2229/18; B01J 2229/32; B01J 2229/38; B01J 2229/40
See application file for complete search history.

(56) References Cited

U.S. PATENT DOCUMENTS

2017/0065927 A1  3/2017  Sauer et al.
2019/0202705 A1* 7/2019  Luo ...................... C01B 39/026

FOREIGN PATENT DOCUMENTS

| CN | 104324747 A | 2/2015 |
|---|---|---|
| CN | 104477933 A | 4/2015 |
| CN | 105524022 A | 4/2016 |
| CN | 106179511 A | 12/2016 |
| CN | 106809848 A | 6/2017 |

OTHER PUBLICATIONS

Jones, C.W., et al., "Organic-functionalized molecular sieves. III. Shape selective catalysis", Microporous and Mesoporous Materials 42 (2001) 21-35.
Yamamoto, K., et al., "Organic-Inorganic Hybrid Zeolites Containing Organic Frameworks", Science, vol. 300, 470-472 (Apr. 2003).
Jones, C.W., et al., "Organic-functionalized molecular sieves as shape-selective catalysts", Nature, 393: 52-54 (May 1998).
Astala, R., et al., "The Properties of Methylene-and Amine-Substituted Zeolites from First Principles", J. Am. Chem. Soc. 2004, 126, 1843-1848.
Cheng-Iong, L., et al., "Study on hydrophobic silylation modification of high silica molecular sieve ZSM-5", Chemical Research and Application, 25(2): 236-239 (2013).
Guo, M., et al., "Modification of ZSM-5 zeolite and its application progress in alkylation", Chemical Engineer, 7: 46-50 (2010).
Wang, Y., "The Modification and Properties of Hierarchical Porous Materials", Chinese Doctoral Dissertations & Master's Theses, Engineering technology I series, No. 3, 97-118, (2017).

* cited by examiner

AMPHIPHILIC MOLECULAR SIEVE CONTAINING LIPOPHILIC GROUP ON THE OUTSIDE AND HYDROPHILIC GROUP ON THE INSIDE AND PRODUCTION METHOD THEREOF

RELATED APPLICATION

This application claims priority under 35 U.S.C. § 119 or 365 to Chinese Application No. 2018100034951, filed Jan. 3, 2018. The entire teachings of the above application are incorporated herein by reference.

FIELD OF TECHNOLOGY

The present invention relates to a molecular sieve and a production method thereof, in particular to a molecular sieve having amphiphilic properties and a production method thereof, belonging to the technical field of molecular sieve production.

BACKGROUND ART

Zeolite is an important inorganic nanoporous material, and the potential demand for zeolites in terms of catalytic activity, selective adsorption, thermodynamic stability, water/chemical resistance and the like continues to grow. Therefore, in order to further investigate the physicochemical properties of the framework, it is indispensable to develop novel zeolite materials containing various elements and functional groups.

Organic functionalized zeolites can control the interaction between multiple organic and inorganic guest species by changing the surface properties, so its range of application will be further expanded. Although the use of organosilane has succeeded in adding new functions to zeolites, this method inevitably leads to structural defects, because the organic groups located in the micropores may destroy their microporosity.

The organic-inorganic hybrid zeolite is synthesized by linking with an organosilane containing a methylene group connecting to two silicon atoms instead of a siloxane. Astala and Auerbach (J. Am. Chem. Soc. 2004, 126, 1843) proved the high stability of methylene-introduced LTA and SOD framework structures with density functional theory. Jones et al (Nature 1998, 393, 52; Microporous Mesoporous Mater. 1999, 29, 339; Mesopor. Mater. 1999, 33, 223; Microporous Mesoporous Mater. 2001, 42, 21) succeeded in synthesizing *BEA molecular sieves, which were functionalized by the use of organic groups on the end groups for shape selection and reaction. This method successfully applied new functions to inorganic substrates using the organosilane. Likewise, this strategy of substituting lattice oxygen atoms with methylene will impart zeolites with new functionality and lipophilic/hydrophobic surface properties. However, this method is merely an introduction of a certain property of either lipophilicity or hydrophilicity, and the introduction of a single group is realized.

SUMMARY OF THE INVENTION

In order to solve the above technical problem, an object of the present invention is to provide a production method of a molecular sieve which will not destroy the characteristics of the original molecular sieve and has hydrophilic and lipophilic amphiphilic properties.

In order to achieve the above technical object, the present invention provides a production method of an amphiphilic molecular sieve containing a lipophilic group on the outside and a hydrophilic group on the inside, characterized in that it comprises the following steps:

step 1: producing a nano-ZSM-5 molecular sieve with a diameter of 50-200 nm;

step 2: dispersing the nano-ZSM-5 molecular sieve into toluene, adding an organosilane containing a lipophilic group and reacting at 60-100° C. for 4-16 h, followed by centrifugation, washing and drying, to obtain a molecular sieve containing a lipophilic group; wherein the amount of substance of the toluene is 60-100 times that of the nano-ZSM-5 molecular sieve, and the amount of substance of the organosilane containing a lipophilic group is 6-10 times that of the nano-ZSM-5 molecular sieve;

step 3: placing the molecular sieve containing a lipophilic group in a mixed solution of sodium hydroxide solution and ethanol and reacting at 60-95° C. for 20-60 min, followed by centrifugation, washing and drying, to obtain a molecular sieve containing a lipophilic group on the outside;

step 4: dispersing the molecular sieve containing a lipophilic group on the outside into toluene, adding an organosilane containing a hydrophilic group and reacting at 60-100° C. for 4-16 h, followed by centrifugation, washing and drying, to obtain the amphiphilic molecular sieve containing a lipophilic group on the outside and a hydrophilic group on the inside; wherein the amount of substance of the toluene is 60-100 times that of the molecular sieve containing a lipophilic group on the outside, and the amount of substance of the organosilane containing a hydrophilic group is 6-10 times that of the molecular sieve containing a lipophilic group on the outside.

In the above production method, the nano-ZSM-5 molecular sieve is produced by a method disclosed in Chinese Patent Application Publication No. CN102689911A (Zhang Zongqi, Gao Xiaohui, Xu Diou, Yan Lijun, Wang Runwei, Zhou Zhiyuan et al. Preparation method of ZSM-5 molecular sieve nanosphere with multi-level pore hollow structure) to obtain a nano-ZSM-5 molecular sieve having a diameter of 50-200 nm.

In the above production method, preferably, the organosilane containing a lipophilic group used has a structural formula as shown below:

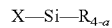

wherein R is a lipophilic group such as benzene ring, linear alkane or cycloalkane;

X is halogen, siloxane or silanol; and a is 1, 2 or 3.

In the above production method, preferably, the organosilane containing a lipophilic group used is methyltriethoxysilane, cetyltrimethoxysilane, n-octyltrichlorosilane, or cyclohexylmethyldimethoxysilane.

In the above production method, preferably, in the step 3, the concentration of the sodium hydroxide solution used is 0.5-6 mol/L.

In the above production method, preferably, in the step 3, the concentration of ethanol is 99% (analytical grade).

In the above production method, preferably, in the step 3, the volume ratio of the sodium hydroxide solution to ethanol in the mixed solution of the sodium hydroxide solution and ethanol is 1:0.1 to 1:10 (the mixed solution of the sodium hydroxide solution and ethanol is produced by using the sodium hydroxide solution and ethanol as raw materials).

In the above production method, preferably, in the step 3, when the concentration of the sodium hydroxide solution is less than 0.5 mol/L, and the alkali etching time is less than 30 min, the obtained amphophilic molecular sieve containing a lipophilic group on the outside and a hydrophilic group on the inside has a hollow structure;

when the concentration of the sodium hydroxide solution is more than 0.5 mol/L, and the alkali etching time is more than 30 min, the obtained amphophilic molecular sieve containing a lipophilic group on the outside and a hydrophilic group on the inside has a half-shell structure.

In the above production method, preferably, in the step 3, the rotate speed of the centrifugation is 6000-12000 rpm, and the duration of the centrifugation is 6-10 min.

In the above production method, preferably, in the step 3, the washing is performed 5-8 times with a mixed solution of clean water and ethanol.

In the above production method, preferably, in the step 3, the drying is performed at 60-100° C. for 8-18 h.

In the above production method, preferably, the organosilane containing a hydrophilic group used has a structural formula as shown below:

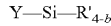

wherein R' is a hydrophilic group such as —NH$_2$, COOH, —CN or —SH;

Y is halogen, siloxane or silanol; and b is 1, 2 or 3.

In the above production method, preferably, the organosilane containing a hydrophilic group used is 3-aminopropyltriethoxysilane, 2-cyanoethyltriethoxysilane or 3-mercaptopropyltriethoxysilane.

In the above production method, preferably, in the step 2, the rotate speed of the centrifugation is 5000-10000 rpm, and the duration of the centrifugation is 5-8 min.

In the above production method, preferably, in the step 2, the washing refers to washing with toluene (3-5 times) followed by washing with trichloromethane (1-2 times).

In the above production method, preferably, in the step 2, the temperature of the drying is 5-80° C., and the duration of the drying is 5-12 h.

In the above production method, preferably, in the step 4, the rotate speed of the centrifugation is 5000-10000 rpm, and the duration of the centrifugation is 5-8 min.

In the above production method, preferably, in the step 4, the washing refers to washing with toluene (3-5 times) followed by trichloromethane (1-2 times).

In the above production method, preferably, in the step 4, the temperature of the drying is 5-80° C., and the duration of the drying is 5-12 h.

The present invention also provides an amphiphilic molecular sieve containing a lipophilic group on the outside and a hydrophilic group on the inside, which is produced by the production method as described above.

The above amphiphilic molecular sieve of the present invention has a diameter of 50-200 nm, and has a half-shell structure, with a lipophilic group on the outside and a hydrophilic group on the inside.

The amphiphilic molecular sieve containing a lipophilic group on the outside and a hydrophilic group on the inside of the present invention has a diameter of 50-200 nm and a morphology of half-shell structure. The molecular sieve has a lipophilic group on the outside and a hydrophilic group on the inside. As compared with the original nano-ZSM-5 molecular sieve, this molecular sieve still maintains the characteristic peak of the original MFI type molecular sieve and maintains the characteristics of the original nano-ZSM-5 molecular sieve, and the original pore size of the molecular sieve did not change, although the original small spherical morphology is destroyed.

The production method of the amphiphilic molecular sieve containing a lipophilic group on the outside and a hydrophilic group on the inside of the present invention aims to change certain hydrophilic properties of the molecular sieve itself. By introducing an organosilane having a lipophilic group to render the outer surface of the molecular sieve lipophilic, then exposing a part of the inner surface of the molecular sieve by an alkali etching method, and introducing a hydrophilic group on the exposed inner surface, the amphiphilic molecular sieve having a lipophilic group on the outside and a hydrophilic group on the inside is finally obtained.

In the production method of the amphiphilic molecular sieve containing a lipophilic group on the outside and a hydrophilic group on the inside of the present invention, the hydrophilic and lipophilic properties of the obtained amphiphilic molecular sieve can be adjusted by changing the type of the organosilane; the morphology of the obtained amphiphilic molecular sieve can be regulated by changing the concentration of NaOH solution and reaction time during the alkali etching. For example, when the concentration of alkali etching is less than 0.5 mol/L, and the alkali etching time is less than 30 min, the obtained amphophilic molecular sieve has a hollow structure; when the concentration of alkali etching is more than 0.5 mol/L, and the alkali etching time is more than 30 min, the obtained amphophilic molecular sieve has a half-shell structure.

The production method of the amphiphilic molecular sieve containing a lipophilic group on the outside and a hydrophilic group on the inside of the present invention for the first time changes the hydrophilicity of the outside of the nano-sized molecular sieve, and then creates new modified sites on the inside of the molecular sieve and impart it with a different affinity from that of the outside. This double-sided asymmetric modification method allows the obtained sample to possess two-sided dissimilar affinities.

The production method of the amphiphilic molecular sieve containing a lipophilic group on the outside and a hydrophilic group on the inside of the present invention has mild conditions and high efficiency, and the obtained product has uniform particle size and controllable morphology. The produced molecular sieve has retained the microporous channels and other properties of the original molecular sieve, while the internal and external surfaces have different affinities, which further enables the obtained molecular sieve to be used in emulsification and catalytic reaction of an incompatible or substantially incompatible two-component mixing system such as water-oil, cycloalkane-aromatic hydrocarbon, or cycloalkane-linear alkane. The material with a hydrophilic group on the inside possesses the properties of a surfactant and can be carried with water, and at the same time, it has good foam-stabilizing property and can realize the encapsulation of hydrophilic and lipophilic components.

DETAILED DESCRIPTION OF PREFERRED EMBODIMENTS

In order to more clearly understand the technical features, objects, and advantageous effects of the present invention, the technical solutions of the present invention will be described in detail below, but it should not be construed as limiting the implementable scope of the present invention.

Example 1

This example provides a production method of an amphiphilic molecular sieve containing a lipophilic group on the outside and a hydrophilic group on the inside, comprising the following steps:

stirring 8 g of tetrapropylammonium hydroxide, 12 g of deionized water, 0.8 g of 1 mol/L sodium hydroxide solution, 0.2 g of aluminum source (aluminum isopropoxide powder), 12 mL of silicon source (ethyl orthosilicate) sufficiently and reacting under hydrothermal conditions for 24 h; centrifuging, washing, drying and sintering to obtain a precursor ZSM-5 molecular sieve;

dispersing the precursor in 60 mL of toluene, and then adding thereto 1.5 mL of cetyltrimethoxysilane, heating in a water bath at 80° C. for 6 hours, centrifuging and drying, to obtain a molecular sieve containing a lipophilic group;

adding the molecular sieve containing a lipophilic group to a mixed solution of 0.5 mol/L NaOH solution and ethanol (99%), treating in a water bath at 80° C. for 30 min, washing by centrifugation with water and ethanol, and drying to obtain a molecular sieve containing a lipophilic group on the outside;

dispersing the molecular sieve containing a lipophilic group on the outside in 60 ml of toluene, and then adding thereto 1.5 mL of KH550 organosilane, heating in a water bath at 80° C. for 6 hours, centrifuging and drying, to obtain a half-shell material of molecular sieve containing a lipophilic group on the outside and a hydrophilic group on the inside.

Figure 1:
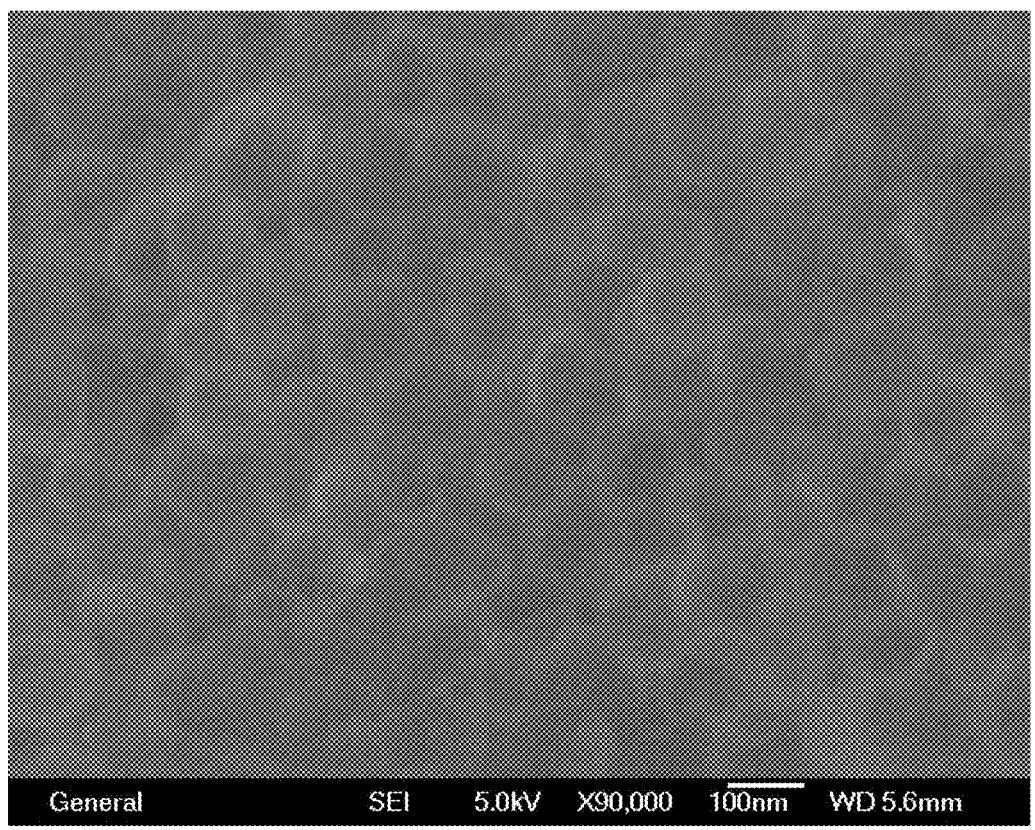
FIG. 1 is a scanning electron microscope (SEM) image of the amphiphilic molecular sieve containing a lipophilic group on the outside and a hydrophilic group on the inside according to Example 1.

For the molecular sieve containing a lipophilic group on the outside and a hydrophilic group on the inside of this example, a SEM image of the sample was obtained as shown in FIG. 1, by using a Hitachi Model JSM-6700F field emission scanning electron microscope, under the condition that the accelerating voltage was 50 kV and the sample was subjected to gold coating for 60 s before the test to increase the conductivity of the sample. As clearly seen from FIG. 1, the finally obtained molecular sieve was a half-shell nanoscale molecular sieve with a particle size of about 150 nm.

Figure 2:
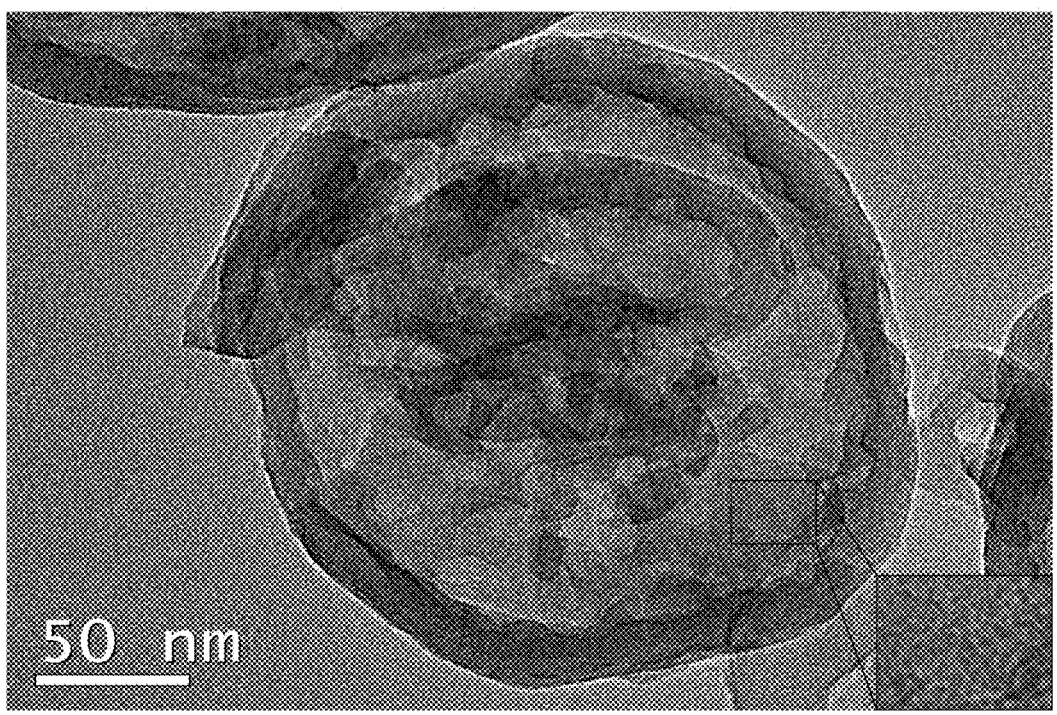
FIG. 2 is a transmission electron microscope (TEM) image of the amphiphilic molecular sieve containing a lipophilic group on the outside and a hydrophilic group on the inside according to Example 1.

The TEM image thereof was obtained as shown in FIG. 2, by using a JEOL Model JSM-2010F field emission transmission electron microscope with an acceleration voltage of 300 kV and a resolution of 0.17 nm. The half-shell structure in FIG. 2 was consistent with the SEM result, and the microporous structure at the edge was also maintained, which fully demonstrated that the sample maintained the microporous characteristics of the molecular sieve itself intact.

Figure 3:
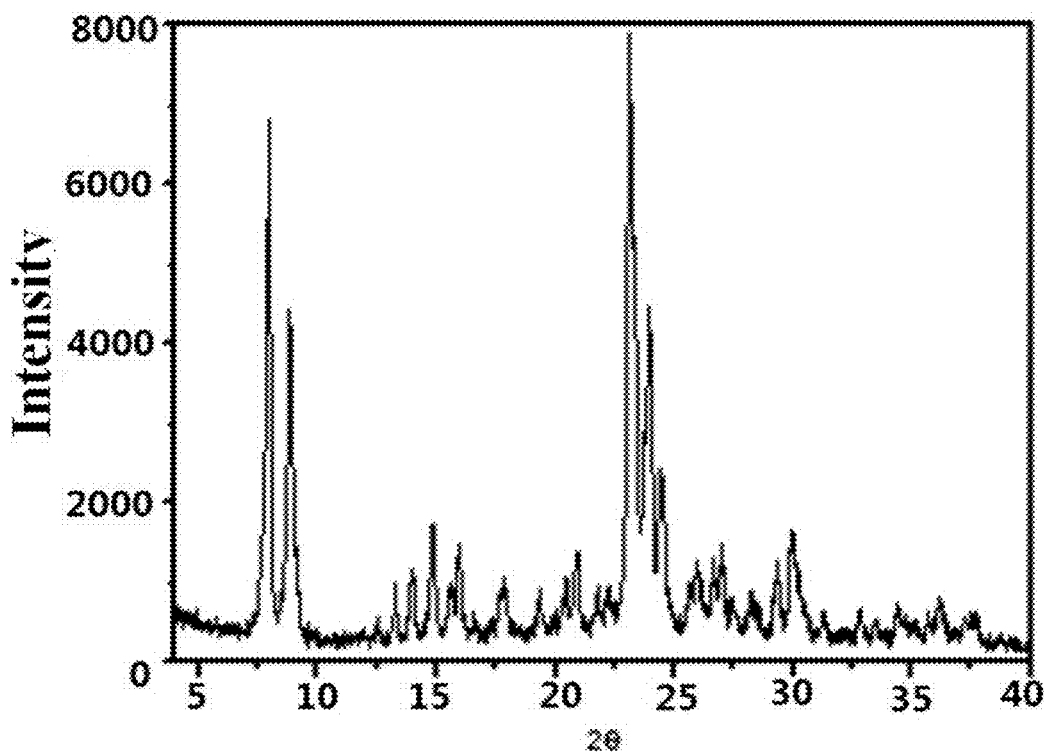
FIG. 3 is a wide-angle XRD spectrum of the amphiphilic molecular sieve containing a lipophilic group on the outside and a hydrophilic group on the inside according to Example 1.

In order to better illustrate the microporous structure of the molecular sieve, a wide-angle XRD spectrum of the sample was obtained using a Rigaku Model D/Max-2550 X-ray diffractometer, as shown in FIG. 3. The XRD diffraction peak of the sample coincided perfectly with the characteristic peak of the MFI-type molecular sieve.

A sample of 0.075 g was placed in a mixed solution of 10 mL of decalin and 10 mL of brine with a concentration of 1 mol/L. After left standing, the sample was in the middle of the solution and has a certain thickness of emulsified layer. This conclusion macroscopically embodies the amphiphilic (hydrophilic and lipophilic) properties of the molecular sieve. The precipitation in the lower part of the water layer can be attributed to the partial damage of the sample during the alkaline etching process.

Example 2

This example provides a production method of a molecular sieve having amphiphilic properties, comprising the following steps:

stirring 8 g of tetrapropylammonium hydroxide, 12 g of deionized water, 0.8 g of 1 mol/L sodium hydroxide solution, 0.2 g of aluminum source (aluminum isopropoxide powder), 12 mL of silicon source (ethyl orthosilicate) sufficiently and reacting under hydrothermal conditions for 24 h; centrifuging, washing, drying and sintering to obtain a precursor ZSM-5 molecular sieve;

dispersing the precursor in 60 mL of toluene, and then adding thereto 1.5 mL of cetyltrimethoxysilane, heating in a water bath at 80° C. for 6 hours, centrifuging and drying, to obtain a molecular sieve containing a lipophilic group;

adding the molecular sieve containing a lipophilic group to a mixed solution of 0.5 mol/L NaOH solution and ethanol (99%), treating in a water bath at 80° C. for 30 min, washing by centrifugation with water and ethanol, and drying to obtain ZSM-5 containing both hydrophilic and lipophilic functional groups.

No modification of the hydrophilic group was performed in the last step in this example, and the molecular sieve having amphiphilic properties was synthesized by matching the hydrophilic properties of the molecular sieve itself with the lipophilic modification. A sample of 0.075 g was placed in a mixed solution of 10 mL of decalin and 10 mL of brine with a concentration of 1 mol/L. After left standing, the position of the sample in the mixed solution was more prone to decalin, indicating that the obtained sample was still amphipathic, but the hydrophilic properties was not as good as those of Example 1, which demonstrated that the hydrophilic modification process could increase the hydrophilicity of the sample itself.

Example 3

This example provides a production method of an amphiphilic molecular sieve containing a lipophilic group on the outside and a hydrophilic group on the inside, comprising the following steps:

stirring 8 g of tetrapropylammonium hydroxide, 12 g of deionized water, 0.8 g of 1 mol/L sodium hydroxide solution, 0.2 g of aluminum source (aluminum isopropoxide powder), 12 mL of silicon source (ethyl orthosilicate) sufficiently and reacting under hydrothermal conditions for 24 h; centrifuging, washing, drying and sintering to obtain a precursor ZSM-5 molecular sieve;

dispersing the precursor in 60 mL of toluene, and then adding thereto 1.5 mL of cyclohexylmethyldimethoxysilane, heating in a water bath at 80° C. for 6 hours, centrifuging and drying, to obtain a molecular sieve containing a lipophilic group;

adding the molecular sieve containing a lipophilic group to a mixed solution of 0.5 mol/L NaOH solution and ethanol (99%), treating in a water bath at 80° C. for 30 min, washing by centrifugation with water and ethanol, and drying to obtain a molecular sieve containing a lipophilic group on the outside;

dispersing the molecular sieve containing a lipophilic group on the outside in 60 ml of toluene, and then adding thereto 1.5 mL of KH550 organosilane, heating in a water bath at 80° C. for 6 hours, centrifuging and drying, to obtain a half-shell material of molecular sieve containing a lipophilic group on the outside and a hydrophilic group on the inside.

In the example, the lipophilic organosilane was changed to cyclohexylmethyldimethoxysilane. A sample of 0.075 g was placed in a mixed solution of 10 mL of decalin and 10 mL of brine with a concentration of 1 mol/L. After left standing, the thickness of the sample in the decalin layer in the mixed solution was increased, which could be well explained with "like dissolves like". This phenomenon indicates that the hydrophilicity and lipophilicity of the sample can be adjusted by changing the organosilane.

Example 4

This example provides a production method of an amphiphilic molecular sieve containing a lipophilic group on the outside and a hydrophilic group on the inside, comprising the following steps:

stirring 8 g of tetrapropylammonium hydroxide, 12 g of deionized water, 0.8 g of 1 mol/L sodium hydroxide solution, 0.2 g of aluminum source (aluminum isopropoxide powder), 12 mL of silicon source (ethyl orthosilicate) sufficiently and reacting under hydrothermal conditions for 24 h; centrifuging, washing, drying and sintering to obtain a precursor ZSM-5 molecular sieve;

dispersing the precursor was in 60 mL of toluene, and then adding thereto 1.5 mL of cetyltrimethoxysilane, heating in a water bath at 80° C. for 6 hours, centrifuging and drying, to obtain a molecular sieve containing a lipophilic group;

adding the molecular sieve containing a lipophilic group to a mixed solution of 0.6 mol/L NaOH solution and ethanol (99%), and treating in a water bath at 70° C. for 20 min, washing by centrifugation with water and ethanol, and drying to obtain a molecular sieve containing a lipophilic group on the outside;

dispersing the molecular sieve containing a lipophilic group on the outside in 60 ml of toluene, and then adding thereto 1.5 mL of KH550 organosilane, heating in a water bath at 80° C. for 6 hours, centrifuging and drying, to obtain a half-shell material of molecular sieve containing a lipophilic group on the outside and a hydrophilic group on the inside.

Figure 4:
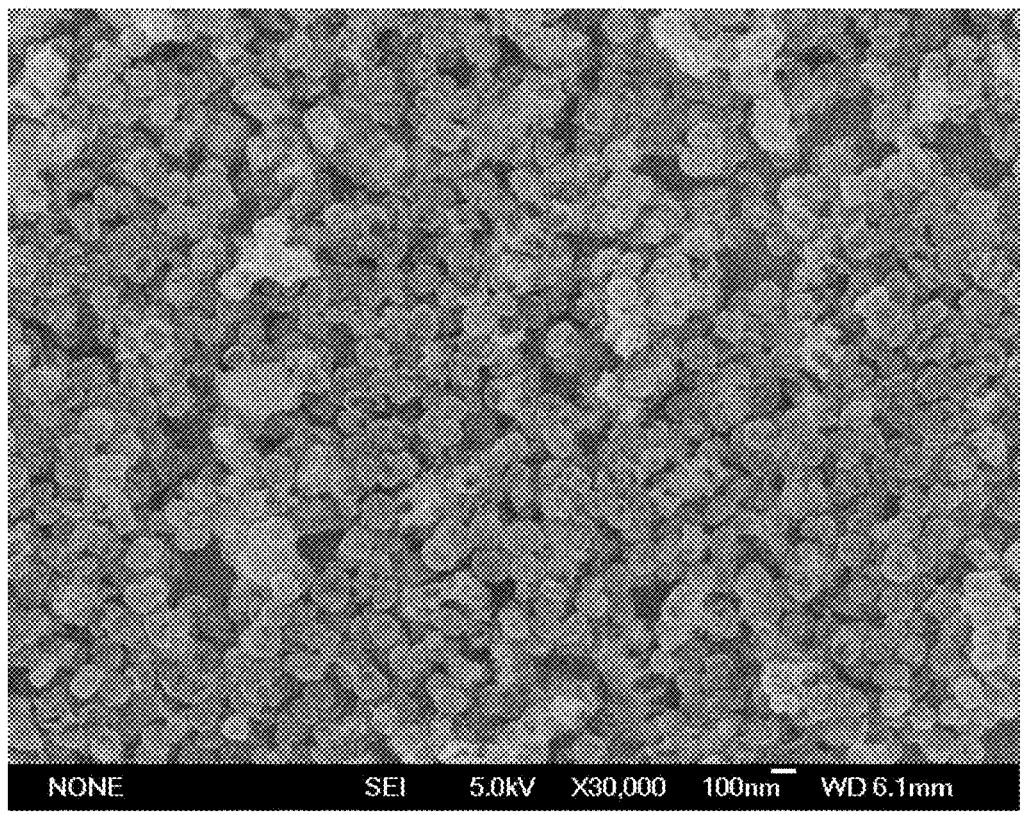
FIG. 4 is a SEM image of the amphiphilic molecular sieve containing a lipophilic group on the outside and a hydrophilic group on the inside according to Example 4.

In this example, the NaOH solution concentration and the reaction time during the alkali etching were changed, and partial half-shell and partial full-shell structures appeared in the scanning electron microscope image of the obtained sample, as shown in FIG. 4. This indicates that the alkaline etching process can affect the properties of the sample.

Example 5

Figure 5:
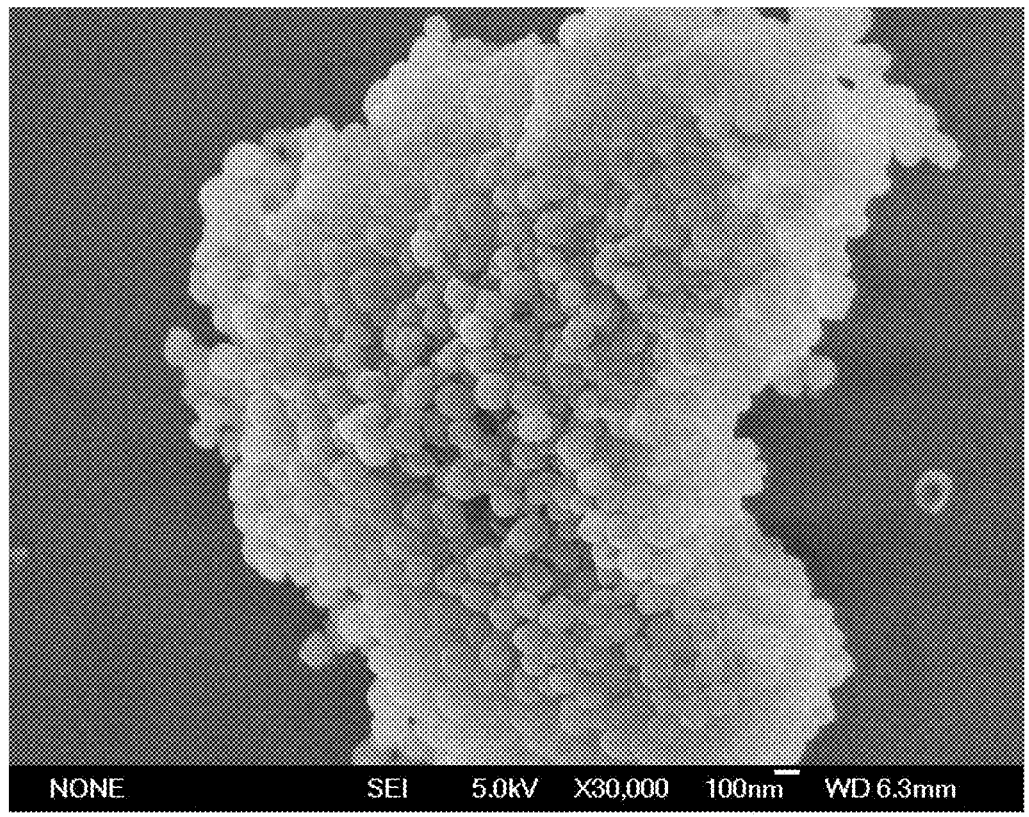
FIG. 5 is a SEM image of the reaction precursor sample according to Example 5.

This example provides a production method of a precursor molecular sieve, comprising the following steps:

stirring 8 g of tetrapropylammonium hydroxide, 12 g of deionized water, 0.8 g of 1 mol/L sodium hydroxide solution, 0.2 g of aluminum source (aluminum isopropoxide powder), 12 mL of silicon source (ethyl orthosilicate) sufficiently and reacting under hydrothermal conditions for 24 h, centrifuging the sample, washing, drying and sintering to obtain a nanoscale ZSM-5 molecular sieve;

The sample obtained in this example has a diameter of 100-150 nm and a microporous structure. The SEM image of the molecular sieve is shown in FIG. 5.

Example 6

This example provides a production method of an amphiphilic molecular sieve containing a lipophilic group on the outside and a hydrophilic group on the inside, comprising the following steps:

stirring 8 g of tetrapropylammonium hydroxide, 12 g of deionized water, 0.8 g of 1 mol/L sodium hydroxide solution, 0.2 g of aluminum source (aluminum isopropoxide powder), 12 mL of silicon source (ethyl orthosilicate) sufficiently and reacting under hydrothermal conditions for 24 h; centrifuging, washing, drying and sintering to obtain a precursor ZSM-5 molecular sieve;

dispersing the precursor in 60 mL of toluene, and then adding thereto 1.5 mL of cetyltrimethoxysilane, heating in a water bath at 60° C. for 4 hours, centrifuging and drying, to obtain a molecular sieve containing a lipophilic group;

adding the molecular sieve containing a lipophilic group to a mixed solution of 0.5 mol/L NaOH solution and ethanol (99%), and treating in a water bath at 80° C. for 30 min, washing by centrifugation with water and ethanol, and drying to obtain a molecular sieve containing a lipophilic group on the outside;

dispersing the molecular sieve containing a lipophilic group on the outside in 60 ml of toluene, and then adding thereto 1.5 mL of KH550 organosilane, heating in a water bath at 90° C. for 8 hours, centrifuging and drying, to obtain a half-shell material of molecular sieve containing a lipophilic group on the outside and a hydrophilic group on the inside.

The position and thickness of the molecular sieve obtained in this Example in the emulsified layer in the decalin and saline are the same as those in Example 1, which indicates that the time and temperature in the organosilane modification reaction have no effect on the reaction within a certain range.

It can be seen from the above examples that the organosilane modification conditions do not affect the molecular sieve within a certain range, and the degree of hydrophilicity and lipophilicity of the molecular sieve can be adjusted by changing the alkali etching conditions and the organosilane to be modified.

The above examples illustrate that the production method of the amphiphilic molecular sieve containing a lipophilic group on the outside and a hydrophilic group on the inside of the present invention has mild conditions and high efficiency. The obtained product has a uniform particle size and controllable morphology. The molecular sieve thus produced has retained the microporous channels and other properties of the molecular sieve while the inner and outer surfaces have different affinities.

The invention claimed is:

1. A method of producing an amphiphilic molecular sieve containing a lipophilic group on the outside and a hydrophilic group on the inside, comprising:
   a) producing a nano-ZSM-5 molecular sieve with a diameter of 50-200 nm;
   b) dispersing the nano-ZSM-5 molecular sieve into toluene, adding an organosilane containing a lipophilic group and reacting at 60-100° C. for 4-16 h, followed by centrifugation, washing and drying, to obtain a molecular sieve containing a lipophilic group; wherein the amount of substance of the toluene is 60-100 times that of the nano-ZSM-5 molecular sieve, and the amount of substance of the organosilane containing a lipophilic group is 6-10 times that of the nano-ZSM-5 molecular sieve;
   c) placing the molecular sieve containing a lipophilic group in a mixed solution of sodium hydroxide solution and ethanol and reacting at 60-95° C. for 20-60 min, followed by centrifugation, washing and drying, to obtain a molecular sieve containing a lipophilic group on the outside; and
   d) dispersing the molecular sieve containing a lipophilic group on the outside into toluene, adding an organosilane containing a hydrophilic group and reacting at 60-100° C. for 4-16 h, followed by centrifugation, washing and drying, to obtain the amphiphilic molecular sieve containing a lipophilic group on the outside and a hydrophilic group on the inside; wherein the amount of substance of the toluene is 60-100 times that of the molecular sieve containing a lipophilic group on the outside, and the amount of substance of the organosilane containing a hydrophilic group is 6-10 times that of the molecular sieve containing a lipophilic group on the outside.

2. The method according to claim 1, wherein the organosilane containing a lipophilic group has a structural formula as shown below:

$$X\text{—}Si\text{—}R_{4-a}$$

wherein R is a benzene ring, linear alkane or cycloalkane;
X is halogen, siloxane or silanol; and
a is 1, 2 or 3.

3. The method according to claim 1, wherein the organosilane containing a lipophilic group is methyltriethoxysilane, cetyltrimethoxysilane, n-octyltrichlorosilane, or cyclohexylmethyldimethoxysilane.

4. The method according to claim 1, wherein in c), the concentration of the sodium hydroxide solution is 0.5-6 mol/L.

5. The method according to claim 1, wherein in c), the concentration of ethanol is 99%.

6. The method according to claim 1, wherein in c), the volume ratio of the sodium hydroxide solution to ethanol in the mixed solution of the sodium hydroxide solution and ethanol is 1:0.1 to 1:10.

7. The method according to claim 1, wherein in c), when the concentration of the sodium hydroxide solution is less than 0.5 mol/L, and the alkali etching time is less than 30 min, the obtained amphophilic molecular sieve containing a lipophilic group on the outside and a hydrophilic group on the inside has a hollow structure;
   when the concentration of the sodium hydroxide solution is more than 0.5 mol/L, and the alkali etching time is more than 30 min, the obtained amphophilic molecular sieve containing a lipophilic group on the outside and a hydrophilic group on the inside has a half-shell structure.

8. The method according to claim 1, wherein in c), the rotate speed of the centrifugation is 6000-12000 rpm, and the duration of the centrifugation is 6-10 min.

9. The method according to claim 1, wherein in c), the washing is performed 5-8 times with a mixed solution of clean water and ethanol.

10. The method according to claim 1, wherein in c), the drying is performed at 60-100° C. for 8-18 h.

11. The method according to claim 1, wherein the organosilane containing a hydrophilic group has a structural formula as shown below:

$$Y\text{—}Si\text{—}R'_{4-b}$$

wherein R' is —NH$_2$, COOH, —CN or —SH;
Y is halogen, siloxane or silanol; and
b is 1, 2 or 3.

12. The method according to claim 1, wherein the organosilane containing a hydrophilic group is 3-aminopropyltriethoxysilane, 2-cyanoethyltriethoxysilane or 3-mercaptopropyltriethoxysilane.

13. The method according to claim 1, wherein in b) and d), the rotate speed of the centrifugation is 5000-10000 rpm, and the duration of the centrifugation is 5-8 min.

14. The method according to claim 1, wherein in b) and d), the washing refers to washing with toluene followed by washing with trichloromethane.

15. The method according to claim 1, wherein in b) and d), the temperature of the drying is 5-80° C., and the duration of the drying is 5-12 h.

16. An amphiphilic molecular sieve containing a lipophilic group on the outside and a hydrophilic group on the inside, produced by the method according to claim 1.

17. The amphiphilic molecular sieve according to claim 16, wherein the amphiphilic molecular sieve has a diameter of 50-200 nm, and has a half-shell structure, with a lipophilic group on the outside and a hydrophilic group on the inside.

* * * * *